US009559472B2

(12) United States Patent
Chien

(10) Patent No.: US 9,559,472 B2
(45) Date of Patent: Jan. 31, 2017

(54) WIRE ARRANGEMENT FOR HAND-REACHABLE USB CHARGER RELATED DEVICES

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 473 days.

(21) Appl. No.: 13/870,253

(22) Filed: Apr. 25, 2013

(65) Prior Publication Data

US 2014/0320063 A1 Oct. 30, 2014

(51) Int. Cl.
| | |
|---|---|
| H02J 7/00 | (2006.01) |
| H01R 25/00 | (2006.01) |
| H02G 11/02 | (2006.01) |
| H01R 13/72 | (2006.01) |
| H02G 3/18 | (2006.01) |

(52) U.S. Cl.
CPC ............ H01R 25/003 (2013.01); H02G 11/02 (2013.01); H01R 13/72 (2013.01); H02G 3/18 (2013.01)

(58) Field of Classification Search
CPC ....... Y02E 60/12; H02J 7/0042; H02J 7/0045; H01M 10/46; H01M 10/44
See application file for complete search history.

(56) References Cited

U.S. PATENT DOCUMENTS

| | | | | |
|---|---|---|---|---|
| 2004/0058649 A1* | 3/2004 | Grady | ................... | G06F 1/1632 455/42 |
| 2011/0084660 A1* | 4/2011 | McSweyn | .......... | H01R 13/6675 320/111 |
| 2011/0215759 A1* | 9/2011 | Lee | ......................... | G06F 1/266 320/115 |

* cited by examiner

Primary Examiner — Arun Williams
(74) Attorney, Agent, or Firm — Bacon & Thomas, PLLC

(57) ABSTRACT

A desktop USB-charger related product has space to receive an AC power-wire, USB-charger wire, or another charging related wire(s). The USB-charger related product is arranged to be installed on a desk top at a hand-reachable distance from a user by attachment means so that there is no need for the user to bend body or knee in order to charge a device using the charger. The USB-charger related product has at least one USB-port that can supply a desired output-current in the range of from 1.0 A to 12 A and 3.5VDC to 8.5VDC by converting input AC power ranging from 110VAC to 250VAC. The USB-charger product may also incorporate at least one additional device such as an AC outlets, sensor, motion sensor, remote control, time display, LEDs, other lights, a power fail device, a smell device, an audio device, a video device, or other electric or electronic devices.

8 Claims, 10 Drawing Sheets

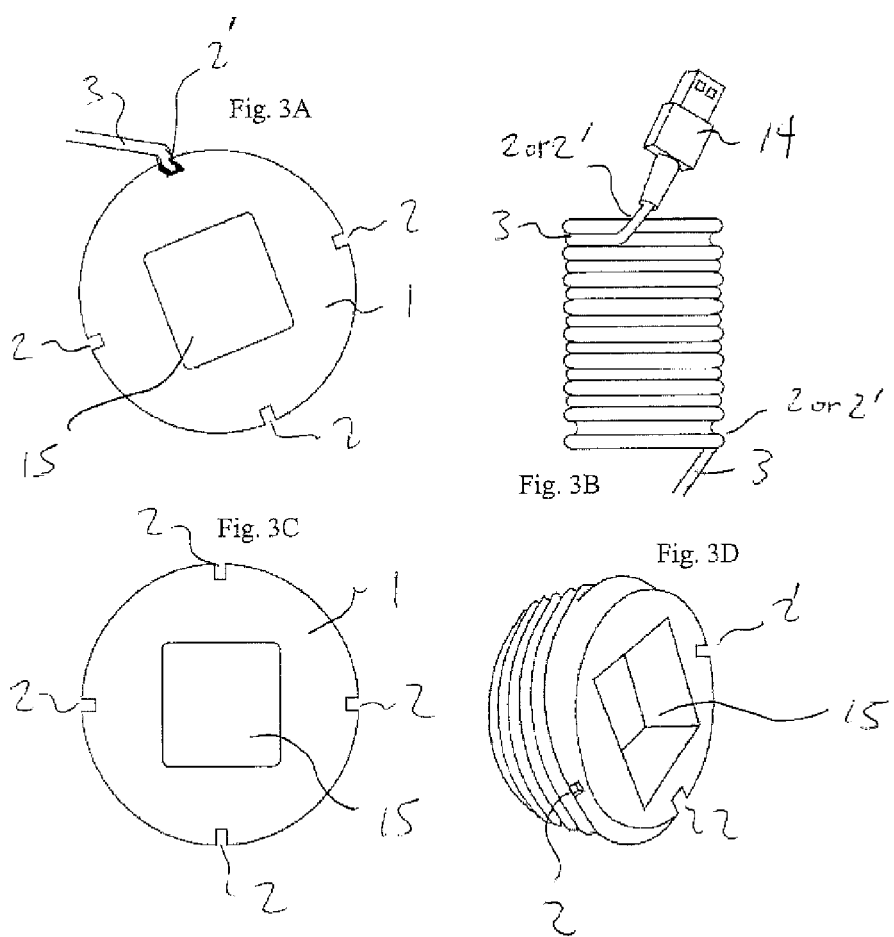

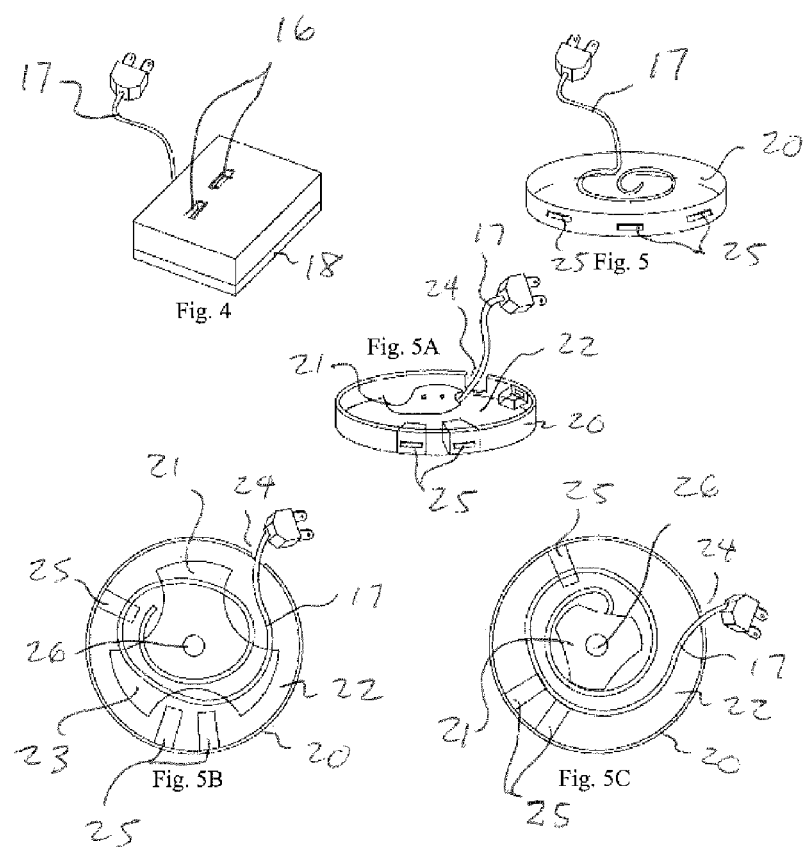

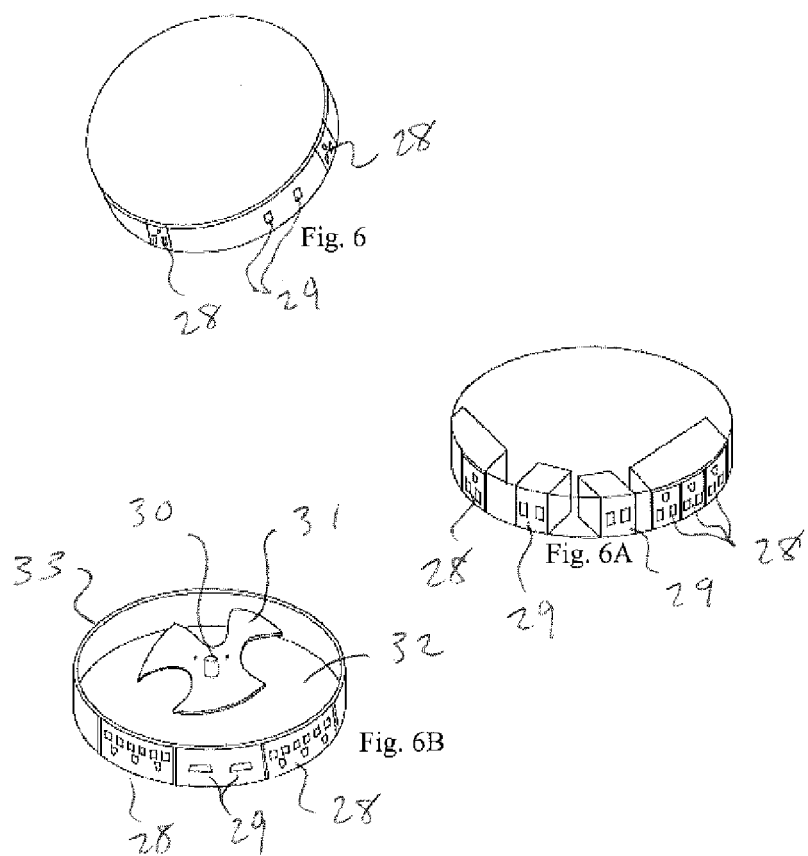

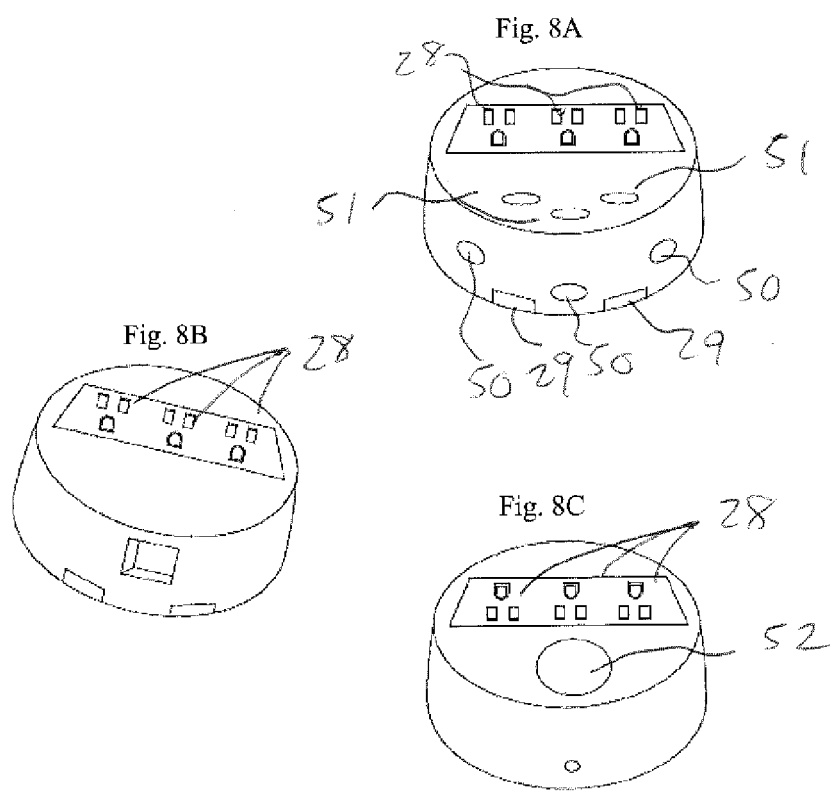

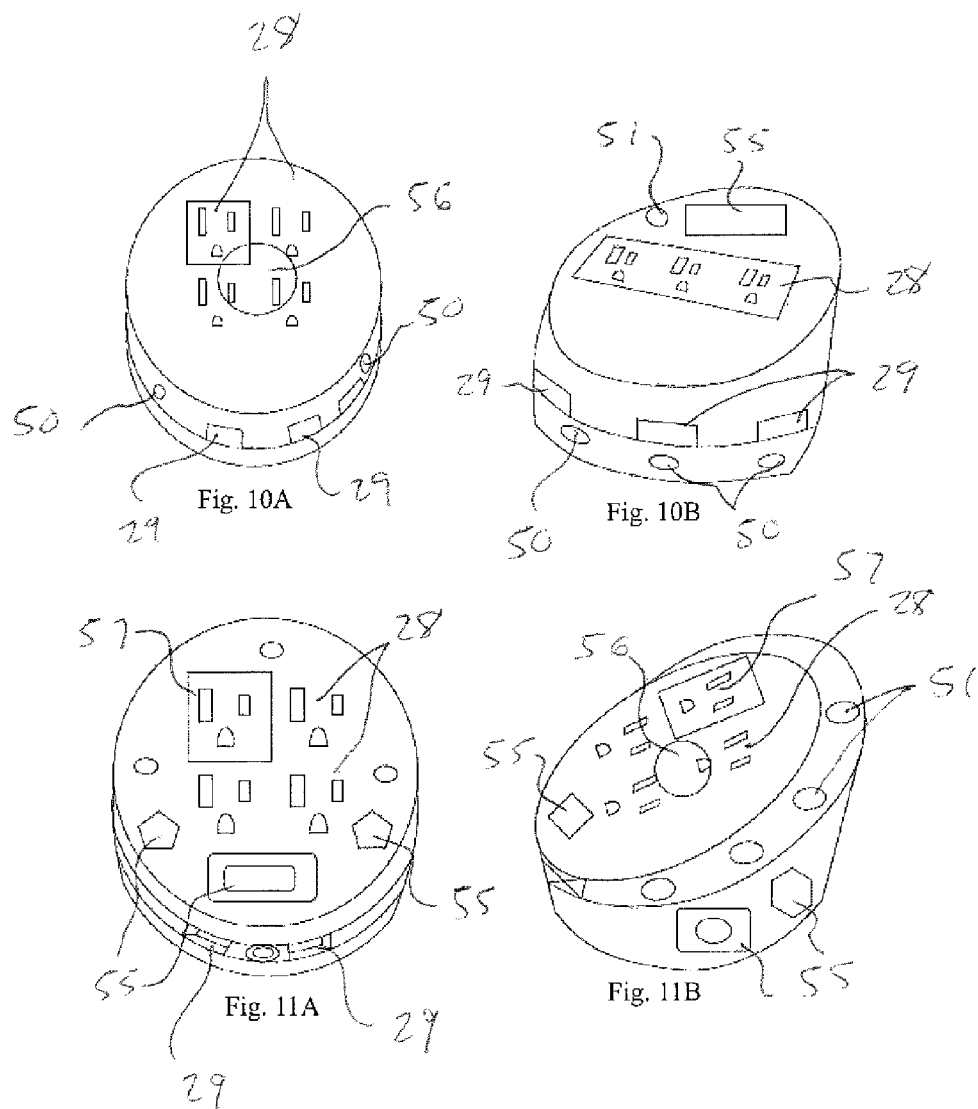

WIRE ARRANGEMENT FOR HAND-REACHABLE USB CHARGER RELATED DEVICES

The current invention is related to the wire arrangement for a USB charger device disclosed in copending U.S. patent application Ser. No. 13/858,604, filed Apr. 8, 2013.

The current invention is related to the power station having built-in LED units and a USB charger disclosed in copending U.S. patent application Ser. No. 13/863,073, filed Apr. 15, 2013.

BACKGROUND

According to the current invention, a USB-charger related product includes a wire arrangement for a receiving-means such as a USB-port, outlet receiving socket, LED-unit, or any combination thereof, that enables the USB-charger related product to be located on a desk surface or other hand-reachable location to offer more convenience to people.

The current invention's features include:
1. Hand-reachability, so that there is no need to bend the human body or knee to initiate charging, thereby preventing people from suffering waist or knee injury, which is especially critical for aged people.
2. Provision of a built-in wire arrangement to coil, wrap, roll, store, and/or release an AC power wire or
   other wires related to a USB charger operation as needed, so that there is no more mess involving AC wires or other wires for charging kits.
3. Desktop installation features such as attachment-means, fixing-means, assembly means, weight means, and/or magnetic means to keep the USB charger related products on a desk top or surface(s) without being moved by the weight of the AC power line or an external force, thereby keeping the products on the desk's surface(s) without drop to the floor.
4. The option of making large but thin products that people will use on a desk top or similar surface without require extra new space for USB Charger related products.
5. A USB charger output-end power min. of from 1.0 Amp up to N-Amp, which is not obtainable
   from laptop USB ports or other portable or travel USB chargers, thereby reducing the long wait time conventionally required for charging electric or electronic devices.
6. The wire arrangement may be implemented by a roller, retractable means, spring means, or twist means to allow people to keep all charging related wires or AC power wires well stored and not make a mess.

These six features of the current invention offer people convenience for living.

The current invention has subject matter in common with the inventor's U.S. patent application Ser. No. 12/950,017, filed Nov. 29, 2010, which discloses a multiple surface LED light with a rotating device that exposes LED light device(s), USB devices, and outlets devices built into a rotating substrate with more than one surface to offer multiple functions. The current invention also has subject matter in common with the inventor's U.S. patent application Ser. No. 11/806,285, filed May 31, 2007, which discloses a multiple function LED light device, and the inventor's U.S. Pat. No. 7,318,652, which is directed to a multiple function wall cover, as well as the inventor's U.S. Pat. Nos. 7,651,365 and 7,810,985. All of these patented or pending cases relate to a light source with outlets devices to which the wire arrangement of the current invention may be applied.

Also by the current inventor are U.S. patent application Ser. No. 13/161,643, filed Jun. 16, 2011, directed to a desk top item with LED means and USB-unit(s) or USB-module(s) to charge other electric or digital-data devices and Ser. No. 13/117,227, filed May 27, 2011, directed to a universal module having USB-unit(s) and/or outlet-unit(s) for a variety of electric or digital-data devices.

The current invention differs from the arrangements disclosed in U.S. prior art at least in the follow respects:

U.S. Pat. No. 7,736,033 (Bhart) discloses a lamp base with an electric device recharge receptacle, and in particular an outlet device and a cigarette lighter built on a lamp base. The lamp base includes circuitry that transforms an input AC current into a 12V DC automobile current, output, and further includes a plug-in device that transforms the input 12VDC current into USB end current (5 Volt). This means that Bhart's device at least needs two expensive circuits/transformers to transform the input 120 VAC wall outlets power supply into a USB 5VDC output. This is not economical and nobody needs a 12VDC output for household use. In contrast, the present invention directly transforms an input-end 120VAC into an output-end 5VDC, which is more practical than the arrangement disclosed by Bhart.

U.S. Patent Publication No. 2011-017703 discloses a rotatable and concealable device which only has an outlet device with manual switch. The input 120VAC power source is connected directly through a metal piece to deliver 120VAC to the rotatable & concealable device's receptacles to offer 120VAC current when another device is plugged into the receptacle. The '703 publication fails to disclose any USB charger concept, circuit, design and application, and so is not related to the current invention.

U.S. Pat. No. 7,897,277 (Meyer et al.) discloses a reversible battery cartridge which is used to provide backup power for all kinds of lamp and mainly for power fail application. This has nothing to do with USB ports and USB charger applications, and therefore is totally different from the current invention, which is related to a device having (1) USB ports+(2) USB charging+(3) an outlet supply power source+(4) an LED light and universal lamp base to fit for all kinds of existing lamp bases so as not to occupy any new desk top space because (5) the universal desk base overlays a top of the existing lamp base. Furthermore, the current invention has (6) an LED light incorporated with the above-listed features (1) (2) (3) (4) and (5), so that it becomes a unique practical universal power station, especially because (7) the current invention can be arranged to not only supply one kind of power to a charger, but also can supply different types of power to different electric or digital-data device(s).

U.S. Pat. No. 6,474,823 discloses a laptop computer with a top illumination light. The computer uses a transformer to converting input AC power into 5 Volt DC current for internal use. However, there is no USB charger circuit inside the computer. Instead, the computer's external transformer directly delivers 5VDC current to the USB port, so the computer system of this patent differs from the charger products of the current invention, which uses an internal USB charger circuit to convert 120VAC into a 5VDC USB charging output. As disclosed in this patent, the computer itself has an input-end current of 5VDC and output-end current at the USB ports that is also 5VDC, so there is no need for a USB charger circuit inside.

Because of the above-described differences, the current invention has at least the following advantages:
A. It offers the most convenient way to use USB ports and/or other power outlets and LED units on a desk surface within a hand-reachable distance. The current invention allows all power stations or products to be installed on the desk top very steadily and overcome the super heavy duty of the power cord, which extends from the wall outlet to the power station or product and exerts a pulling force as a result of the cord's weight. The normal design for all marketed extension cords with built-in outlets or additional features such as USB ports, audio-ports, video-ports, internet-ports, or other electric's ports is not capable of being put on a desk top because the power-cord's weight is way too heavy if the outlet's power cords meet safety authorities' requirement that power cords use 10, 12, 14, or 16 gauge wire. Such a very heavy duty cord, which may have different lengths of from 1 foot to 100 feet is impossible to install on a desk top. Furthermore, such a conventional outlet device does not really need to be put on a desk top because there are too few occasions to plug or unplug the plugs of electric or electronic devices into or from the outlet device. However, the current invention has built-in USB ports or LED light devices, for which there is a need to connect to the USB-ports or turn on-off the said LED unit(s) many times per day or at least once a day because of the many devices, such as cellphones, mobile phones, smartphones, i-Pads, and panel communication or consumer computer devices that need to be charged from USB ports. The current invention offer the most continent to put the USB-ports and LED units on the desk top to prevent from people bend the body and knee down to connect the grounded multiple function extension cord or wall mounted USB ports, The current invention offers the most convenient way for people to get power from built-in outlets or USB ports and also provide functions of built-in LED units just on a desk top. This is a major concept for the current invention.

B. The current invention offers a simple way to install a power station or products on a desk surface so that there is no need for people to bend their body or knee to a lower position in order to obtain charging and prevent injury or damage to the human waist and knee.

C. The power station of the invention can be adapted to include the unique features described in the inventor's copending U.S. patent filings in order to supply power to charge the majority of electric, digital-data, audio, video, or internet devices on a desk top without the need to frequently bend the body to or near the ground when connecting to an outlet or USB port, or making use of an LED unit.

The current invention may also be applied to the following:
(A) a rotating LED light device having outlets or electric receiving sockets as disclosed in copending U.S. patent application Ser. No. 12/950,017, filed Nov. 19, 2010;
(B) an electrical device having a built-in universal USB-unit(s) and outlet-unit(s), as disclosed in copending U.S. patent application Ser. No. 13/117,227, filed May 27, 2011;
(C) a desk top LED device having a USB-unit(s) or outlet-unit(s) to charge an electric or digital device, as disclosed in copending U.S. patent application Ser. No. 13/161,643, filed Jun. 16, 2011; and
(D) a multiple function LED night light as disclosed in U.S. patent application Ser. No. 11/806,285, filed May 31, 2007.

The current invention may also use the following concepts described in the following LED-related filing cases of the inventor: (1) a project light, (2) more than one function, (3) adjustable focus, (4) adjustable angle, (5) elastic contact points, (6) an LED heat solution, (7) heat sensitive parts installation, and (8) extend means, disclosed in the inventor's U.S. patent application Ser. Nos. 13/367,758; 13/367,687; 13/296,508; 13/295,301; 13/021,107; 12/950,017; 12/938,564; 12/886,832; 12/876,507; 12/771,003; 13/021,124; 12/624,621; 12/622,000; 12/318,470; 12/914,584; 12/834,435; 12/292,153; 12/907,443; 12/232,505; 11/806,711; and 11/806,285.

The current invention also has subject matter in common with the inventor's U.S. patent application Ser. No. 13/295,301 ("The Device has build-in Digital Data means and Powered by unlimited power source of light device"); Ser. No. 13/296,508 ("The Device has build-in Digital Data means and power unlimited power source of LED Bulb"); Ser. No. 13/296,460 ("The device has build-in Digital data means and powered by unlimited power source of Lamp Holder"); Ser. No. 12/951,501 ("Lamp Holder has built-in LED Night light"); Ser. No. 12/950,017 ("Multiple surface LED light"); Ser. No. 13/162,824 ("Light device with display means has track-means and removable LED-unit(s)"); Ser. No. 12/938,628 ("LED light fixture has outlet(s) and removable LED unit(s)"); Ser. No. 12/887,700 ("Light fixture with self-power removable LED unit(s)"); Ser. No. 12/149,963 (now U.S. Pat. No. 7,722,230); Ser. No. 12/073,095 (now U.S. Pat. No. 7,726,869); Ser. Nos. 12/073,889; 12/007,076 (now U.S. Pat. No. 7,726,841); Ser. No. 12/003,691 (now U.S. Pat. No. 7,726,839), and Ser. No. 12/894,865.

In addition to the above, light device related patent applications of the inventor include U.S. patent application Ser. Nos. 13/295,301, 13/296,469, 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11/527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156, 11/094,155, 10/954,189, 10/902,123, 10/883,719, 10/883,747, 10/341,519, 12/545,992, 12/292,580, 12/710,918, 12/624,621, 12/622,000, 12/318,471, 12/318,470, 12/318,473, 12/292,153, 12/710,561, 12/710,918, 12/711,456, and 12/771,003.

The relevance of the following U.S. patent applications of the inventor can be understood from the titles listed in parentheses: Ser. No. 13/295,301 ("Device has built-in digital data means and powered by unlimited power source for Lamp holder"); Ser. No. 13/296,469 ("Device has built-in digital data means and powered by unlimited power source for light Device"); Ser. No. 12/951,501 ("Lamp Holder has built-in LED light"); Ser. No. 12/771,003 ("LED light has geometric-unit(s) incorporated project means"); Ser. No. 12/711,456 ("LED power failure Light"); Ser. No. 12/710,561 ("LED light device has special effects"); Ser. No. 12/710,918 ("LED light device has more than 1 reflective means for plurality of image"); Ser. No. 12/624,621 ("projection device or assembly for variety of LED light"); Ser. No. 12/622,000 ("Interchangeable Universal Kits for all LED light"); Ser. No. 12/318,471 ("LED night light with pinhole imaging"); Ser. No. 12/318,470 ("LED night light with Projection features"); Ser. No. 12/318,473 ("LED night light with laser or hologram element"); Ser. No. 12/292,153 ("LED night light with Projection or imaging features"); Ser. No. 12/232,505 ("LED night light with Projection features"); Ser. No. 12/149,963 ("Removable LED light device") [Ser. No. 12/149,964 ("Surface Mounted device with LED light"); Ser. No. 12/073,095 ("LED Track light device"); Ser. No. 12/073,889 ("LED light with changeable position with Preferable power source") [Ser. No. 12/007, 076 ("LED light with changeable geometric system"); Ser. No. 12/003,691 ("LED light with changeable geometric dimension features"); Ser. No. 12/003,809 ("LED light with changeable features"); Ser. No. 11/806,711 ("Multiple LED light with adjustable angle features"); Ser. No. 11/806,285 ("LED Night light with outlet device"); Ser. No. 11/806,284 ("LED Night light with more than 1 optics means"); Ser. No. 11/527,628 ("Multiple function Night light with air freshener"); Ser. No. 11/527,629 ("LED Night light with interchangeable display unit"); Ser. No. 11/498,874 ("Area illumination Night light"); Ser. No. 11/527,631 ("LED Time piece night light"); Ser. No. 12/545,992 ("LED time piece Night light"); Ser. No. 12/292,580 ("LED Time Piece Night light") Ser. No. 11/498,881 ("Poly Night light"); Ser. No. 11/255,981 ("Multiple light source Night Light"); Ser. No. 11/184,771 ("Light Device with EL elements"); Ser. No. 11/152,063 ("Outlet adaptor with EL"); Ser. No. 11/094,215 ("LED night light with liquid medium"); Ser. No. 11/094,215 ("LED Night light with Liquid optics medium"); Ser. No. 11/092,741 ("Night light with fiber optics"); Ser. No. 10/883,747 ("Fiber Optic light kits for footwear"); Ser. No. 11/498,874 ("Area Illumination for LED night light"); Ser. No. 11/527,629 ("Time Piece with LED night light"); Ser. No. 11/527,628 ("Multiple Function Night light with Air Freshener"); Ser. No. 11/806,284 ("LED Night light with more than one optics mediums"); Ser. No. 11/806,285 ("LED Night Light with multiple function"); and Ser. No. 11/806,711 ("Multiple LEDs Light with adjustable angle function").

The inclusion of any of the features disclosed in the above-listed patents filings of the inventor may still fall within the scope of the current invention and all related equivalent functions or replacement parts also should fall within the current invention's scope.

The current invention relates to a wire arrangement for hand-reachable desktop "USB charger related products." The term USB charger related products in turn relates to products that at least have one USB charger with its receiving-means and any combination of additional market-available electric or electronic parts and accessories to form a single or plurality of function(s) device that can be placed on a desktop to offer people convenience without bending the body or knee to connect a device for charging.

BRIEF DESCRIPTION OF THE DRAWINGS

FIGS. 1, 3B, and 3D are isometric views of a first preferred embodiment of the invention, which includes a wire arrangement for USB-charger related products.

FIGS. 3A and 3C are end views of the embodiment of FIGS. 1, 3B, and 3D.

FIG. 4 is an isometric view of a fourth preferred embodiment, which includes a wire arrangement for a hand-reachable USB charger device embodiment that only has a built-in USB charger without other combination items such as outlets, an LED unit, or electric parts and accessories for carrying out other functions.

FIGS. 5, 5A-5C, 6, and 6A-6B are isometric views of a fifth preferred embodiment of the invention, which includes construction parts to form a space, gap, or dimension to allow application of simple physics and mechanical theory to arrange a wire by twisting a top cover to wind or release the wire when people sit at the desk and charge their other electric devices by a hand-reachable USB charger or outlet, the wire arrangement being situated on the bottom of the USB charger related unit or product using an overlay so that there is no need to take up any extra space on the desktop.

FIGS. 8A-8C, 9A-9E, 10A-10B, 11A-11B, and 12A-12B are isometric views of a different USB charger and USB Charger related products having a built-in wire arrangement, the USB charger related products incorporating at least one device selected from a USB charger device, outlet device(s), LED light device(s), time piece device(s), motion sensor device(s), remote control device(s), smell device(s), motion device(s), animation device(s), audio device(s), video device(s), Internet device(s), digital data device(s) or other electric or electronic device(s) available from marketplace to provide a more-than-one-function product.

While FIGS. 1 to 12 show concepts of the current invention, it will be appreciated that any similar concept or equivalent application with a same purpose or that is based on a same physics theory or knowledge may still fall within the invention's scope or claim coverage.

DETAILED DESCRIPTION OF THE PREFERRED EMBODIMENTS

Figure 1:
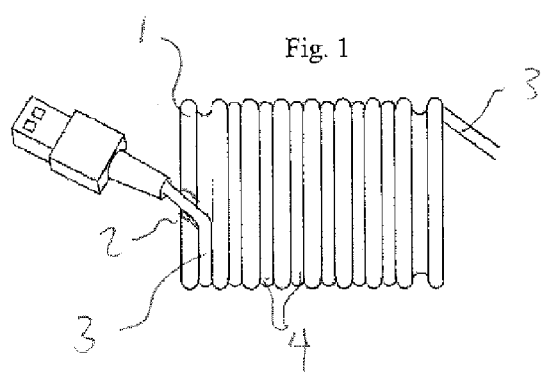

FIG. 1 shows a wire arrangement for a USB charger having at least one hold-means 1 with cut-outs 2, as illustrated in greater detail in FIGS. 3A to 3D. In this arrangement, a wire 3 is positioned in a continuous groove 4 and exits the arrangement through cut-outs 2.

The desk top USB charger may include any combination of a USB-charger(s), outlet(s), LED-unit(s), sensor means, switch means, remote-means(s), motion means, and/or other electric device(s).

Figure 2:
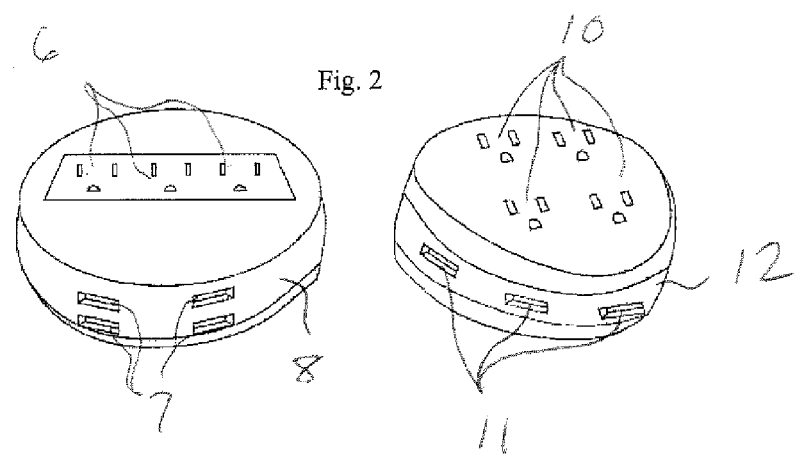
FIG. 2 includes isometric views of second and third preferred embodiments of the invention, which includes a wire arrangement for a hand-reachable USB charger device.

FIG. 2 shows a USB charger having 3 AC outlets 6 side-by-side and 2 sets of 2 USB charging ports 2 with a wire arrangement means inside the base 8 to be installed on a desk's surface(s) at a hand-reachable location(s).

FIG. 2 also shows a second embodiment having 4 outlets 10 and 3 USB-charging ports 11 with a wire-arrangement in the base 8 to adjust the wire length as needed from the base to power source, so that even heavy gauge wire will not make a mess when installed on the desk surface, so people can connect equipment with a charger or power source without the need to bend the body because the charger or power source is on the desk top at a hand-reachable location that is most convenient rather than at a lower location or on the floor, which will harm an aged person's waist and knee to cause thousands or hundreds of thousands of dollars for medical surgery.

As shown in FIGS. 3A, 3B, 3C, and 3C, at least one of the output openings or cut-outs 2 for the wire 3 can be cut-out at an angle, as indicated by reference numeral 2' in FIGS. 3A, 3B, and 3D, so that the wire will not be bent at too great an angle and thereby prevent damage to the wire's inner conductive means. The angle for the cut-outs can each be 60 degrees or 30 degrees depending on requirements. The cut-outs can extend from the edge to inner walls so as to let people hold the wire at any location along a continuous groove, ditch, or channel at any near-by cut-out location.

As shown in FIG. 3B, the walls can have any number of cut-outs 2 or 2' at the output-end at any location along the continuous groove, ditch, channel, or gaps 4 to allow the wire to come out at any location preferred by people. The narrow cutout's output-end can tightly hold a USB wire with a desired angle so that no harm occurs to the USB wire. The FIG. 3-2 shows only the USB-plug 14 of the USB wire, the other end being connected to a device such as an iPhone, HTC phone, Samsung phone, China mobile phone, flat-panel device, computer device, audio device, video device, or any other USB chargeable device. The ditch, groove, or channel 4 is preferably a continuous arrangement so that sections of the wire 3 do not overlay each other. If the wire arrangement means is not a continuous design, the wire will overlay or underlay when people coil it. However, this overlay or underlay will still fall within the current invention scope. In addition, the wire arrangement means can be made of a soft gel, in which case it can be fitted over a USB-charger so that the charger is positioned with a central compartment 15 within the wire arrangement, and the continuous groove 4 and cutouts 2 or 2' can be dimensioned to tightly hold the wire in place.

FIG. 4 shows a device having only 2 USB ports 16 without an AC power source outlet(s) so that only a small AC power input wire 17 is needed to supply power to the USB-charger. This kind of USB charger may be installed on a desktop or other surface at a hand-reachable location using traditional attachment-means 18 such as glue, double sided tape, Velcro tape, catches, hooks, screws, a suction cup, magnetic-means, catch-means, hold-means, heavy-means, catch-holder means, or any other attachment-means or fixing-means to enable easy use of the USB charger very often. When the USB-charger has a built-in AC power source outlet, it has to use heavy duty electric-cord such as #14 gauge and very good means to hold the USB-charger and outlets on the desk top or other surface so as to overcome the very heavy weight of the #14 gauge wire. The wire arrangement means has parts and accessories to hold, store, coil, receive, release, pull, twist, extend, fold, and/or retract a wire by a spring, elastic, roller, or rotating means to cause the wire to be well arranged to achieve pre-designed requirements, performance, functions, or effects.

FIG. 5 shows an arrangement with 3 USB ports in a flat and thin USB-charger device, the AC power input wire 17 being coiled or wrapped under the bottom of the round flat and thin USB charger unit. The round flat and thin unit can be put under base of another existing desk-top device, such as a desk-lamp base, coffee cup base, coffee machine base, ashtray base, beverage cup base, phone base, calculator base, medicine bottle base, or other bottle or container base so that the round flat and thin USB charger will not occupy a new space to take away from the limited desk top space. The wire can be coiled or wrapped under the USB-charger unit base, within the housing, or within the walls as described below. The wire arrangement means may have parts and accessories to hold store, coil, receive, release, pull, twist, extend, fold, or retract the wire by a spring, elastic, roller or rotating means to cause the wire or receiving-end(s) of the wire to be well arranged for use in connection with pre-designed requirements, performances, functions, or effects. Since the USB-charger related products do not have AC outlets, LED-units, or other electric function devices built-in, the input AC power wire can be smaller than required for an AC power outlet device.

As shown in FIG. 5A, a preferred wire arrangement means may be designed to include a round and thin housing 20 with USB ports 25 with a central island-shaped wire arrangement mechanism 21, which can easily coil or wrap the wire within a space, gap room, or compartment 22. The island-shaped wire arrangement mechanism includes a cover 23 to stop the wire from falling out from the space, gap, room, or compartment 22. The island-shaped wire arrangement mechanism allows the wire's length to easily be seen when the wire is inside the space. The output-end of the wire arrangement means has a cutout 24 so as to enable the flat and thin USB-charger unit to be installed on any surface.

The USB charger or USB-charger with built-in outlet(s) or USB-charger with built-in outlet(s) and another function device(s) may be round or have any desired geometric shape without departing from the scope of the current invention. Because the USB-charger related products of FIG. 5A only has USB ports 25 without other outlets, LED-units, or other electric function devices, the built-in AC input power wire can be smaller than required for a device with AC output power requirements.

As shown in FIG. 5B, the wire arrangement means on the bottom of unit includes a center pole 26 around which the wire is coiled or wrapped, and a built-in island-shaped mechanism's cover 23 to stop wire 17 from falling from base. A wire output-end with cut-outs has a hold-function to hold the wire in position. The wire arrangement may also have a built-in heavy weight, suction cup, magnetic means, double sided foam tape, Velcro tape, screw, base, or other attachment or fixing-means to secure the round flat and thin USB charger unit in a position without being moved and make a nice and neat wire arrangement from an AC power source to supply a desired current from 1.0 A up to 12 A or more from the USB-ports 25, which is not possible to obtain from any existing device such as a laptop computer's USB ports, whose 2.0 or 3.0 modes can only supply 0.5 A or a maximum of below 1.0 A current. The current invention's USB charger can have a higher output of more than 1.0 Amp up to 12 Amps or more depending on market requirements. Because the USB-charger related product of FIG. 5B only has USB ports 25 and no AC outlets, LED-units, or other electric function device(s) built-in, the AC power input wire may be smaller than would be required if AC outlets or AC devices with higher power requirements were included.

FIG. 5C shows the preferred USB-charger in the form of a round-flat unit which can underlay any existing desktop device and does not need to occupy any additional desktop space. As shown in FIG. 5C, the USB-charger related product only has USB ports 25 without any additional outlets, LED-units, or other electric function device(s) so that the size of the built-in AC power input wire 17 can be minimized.

FIG. 6A, shows a geometrically shaped USB charger unit having both USB-ports 29 and built-in AC outlets 28 which need a heavy duty electric cord so the cord's weight will be very heavy to pull on and move the unit in the absence of attachment means to fix the unit at a desired location. The attachment means may include a heavy weight, magnetic means, glue, double sided foam tape, screws, a catch-n-hook fastener, Velcro means, or other market-available skills or materials. The geometrically shaped unit is illustrated as a round flat and thin unit having interior magnetic and heavy weight means to overcome pulling force exerted by the heavy duty AC electric cord, which is required by some safety authorities to be #14 gauge, although the gauge may be variable based on safety requirements for different applications and countries. The preferred round flat and thin unit is designed to underlay any items put on top of it because it is thin, flat, and water resistant, and all receiving USB-ports or outlets ports are on a side with a nice slope so that anything can be put on top and there is no need for any new space on the desktop when using the current invention's unit, which may be (1) a simple USB charger with a small electric wire, (2) a combination of a USB-charger and outlet unit, (3) a combination of a USB-charger, outlet unit, and LED-unit, or (4) a combination of units with more than three functions selected from any electric, electronic, or digital data device or internet devices functions.

FIGS. 6, 6A, 6B, 6C, 7, and 7A all show USB-charger related products having USB ports 29 and AC outlets 28 only without LED-units or other electric function device(s), and having a built-in AC input power wire which meets the AC outlet power wire requirements and optionally incorporates other one or more additional outlet device components such as surge protection means, remote control means, a master power outlets (that controls all other outlets by causing the other outlets to follow the master), sensor control means, remote control means, current leakage warning means, and auto shut off means to provide the outlets with greater safety and convenient performance.

FIG. 6A, shows an embodiment of a round flat and thin USB-charger related unit which has 4 USB ports 29 and 4 outlets 28 as well as at least one built-in additional function device selected from market-available electric, electronic, digital-data, communications, computer, or other devices. FIG. 6B also shows a preferred space for the USB-charger and outlets' body and a face arrangement for round flat and thin unit (not including the heavy AC electric cord and its plug-means).

FIG. 6B also shows the bottom construction for the bottom wire arrangement means which has a center pole 30 to hold an island-shaped stopper means 31 to prevent the wire falling out from the built-in space, room, or compartment 32 that holds the wire when it is coiled or wrapped around the center pole 30 and which extends to a curved wall 23. In this embodiment, 6 AC outlets 28 and 2 USB-ports 29 are preferably arranged within the bottom of the unit.

Figure 7:
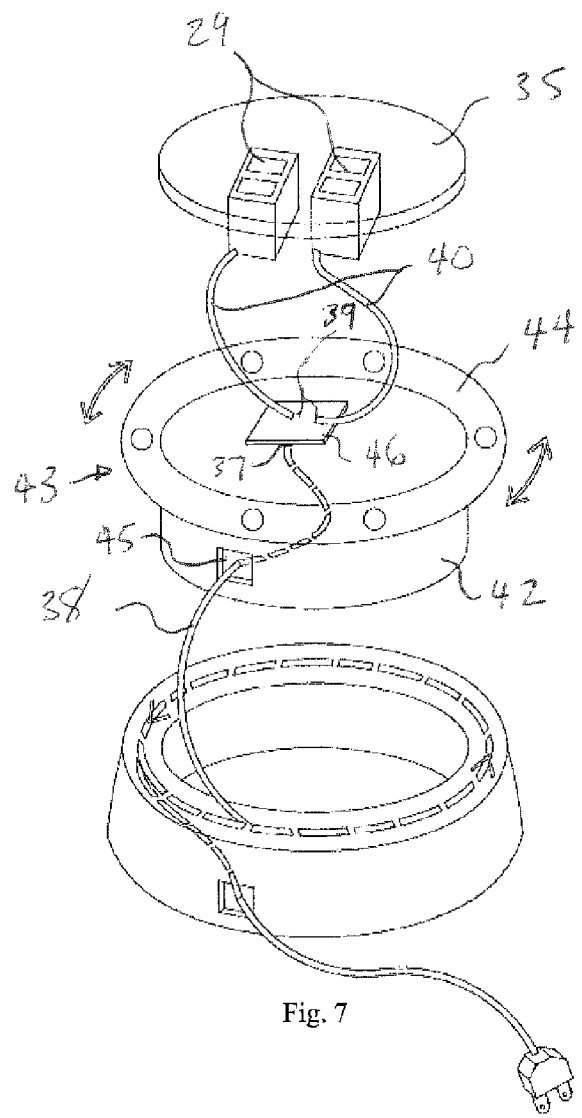
FIG. 7 and FIG. 7A are isometric views of a sixth preferred embodiment which has a twister-means that uses a rotatable top cover to coil or release a wire to or from a space, gap, room, or compartment in the wire arrangement, the wire having a predetermined desired wire length and wire gauge.

FIG. 7 shows a central rotating means to cause wire release or coiling back to the unit, the construction of which includes:

(1) A top cover 35 installed with receiving means that include any desired combination of at least one USB-port 29, outlet, LED-unit, sensor means, motion sensor, remote control means, audio or video related means, digital data-means, internet related means, or other market-available electric or electronic means.

(2) At least one of the receiving-means wires 36 from the USB-port 29 and outlet or LED-units is connected to internal circuit-means and/or circuit means having a built-in PCB 46 PCB input-end 37 to connect with an electric power input wire 38. The PCB output-end 39 is connected to the wires 40 from the receiving-means. The circuit means uses the PCB 46 to connect the wires 40 from the receiving-means at the output-end 39 with the power source input wire 38 at the on input-end 37.

(3) The AC electric input power wire 38 is coiled or wrapped within the unit housing, for example by a rotatable inner-housing-wall 42 of a rotatable-means 43, and can be released or coiled by rotating a top ring 44 or part of the unit's housing. The preferred twisting-means may be a finger twister, which can have any design such as a pole, a holder, a concave finger holes, ribs, raised bars, or other twisting-means.

(4) At least one opening 45 is provided in the rotatable inner housing-wall 42 that contains the PCB 46 with the circuit means for converting input power into appropriate output power current and voltage. The opening 45 will rotate when the rotatable inner housing-wall 42 is rotated and cause the PCB input end's electric power wire 38 to be coiled or released from the opening 45 located on the rotatable inner housing-wall 42.

(5) As a result, the power input wire can be easily coiled or released from the power input wire output-end.

Figure 7A:
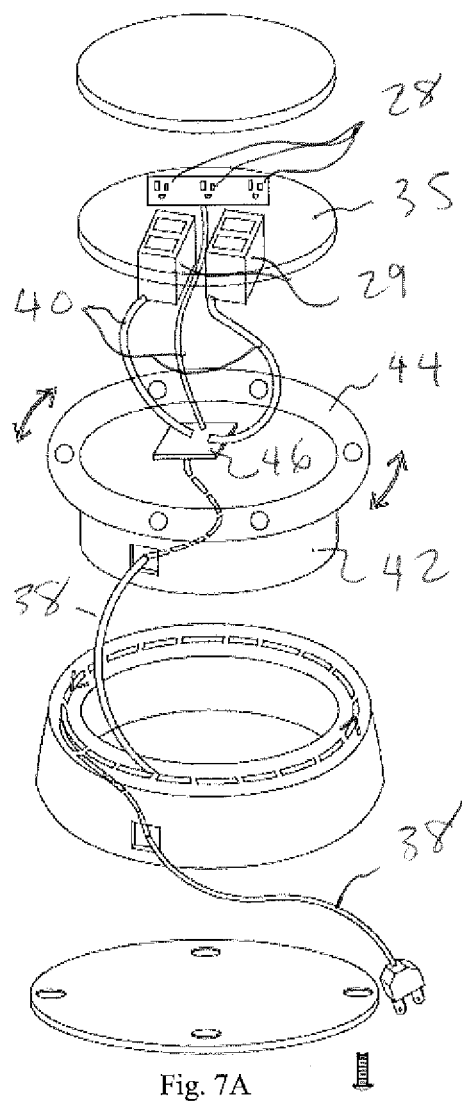
Figure 9A:
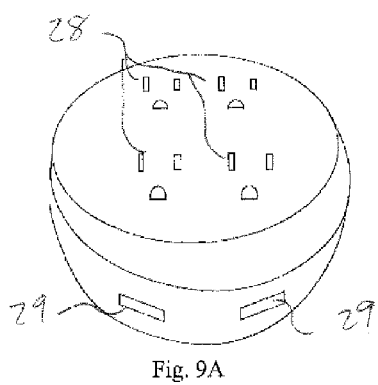
Figure 9B:
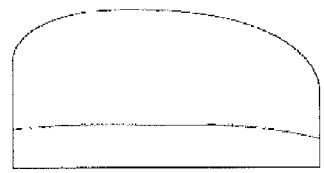
Figure 9C:
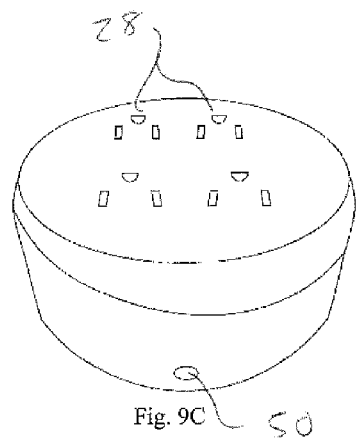
Figure 9D:
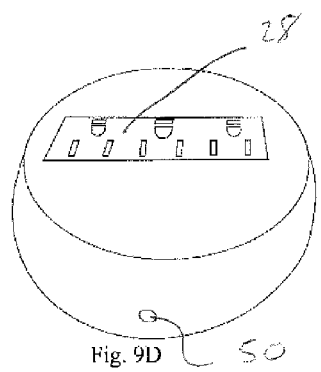
Figure 9E:
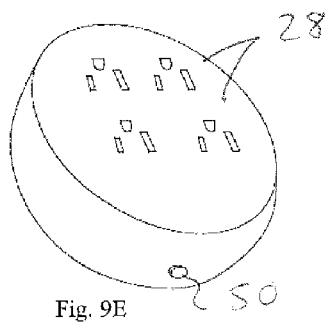

FIG. 7A shows further details of the arrangement of FIG. 7.

FIGS. 8A, 8B, and 8C show an embodiment which has a built-in wire arrangement means on the base to coil and release a power wire(s) so as to achieve a nice and neat arrangement of the wire from the power source to the desk top and allow the USB-charger unit to be placed at a hand-reachable distance on the desktop for use in charging other electric, electronic, digital-data, image, audio, video, or other available devices from the marketplace without requiring the user to kneel down or bend in order to connect a device with the charger.

FIG. 8A shows a plurality of LED-units 50 for front illumination, and a plurality of LED units 51 for top-facing illumination and that light-transmitting items to be put on top of the LEDs to achieve different light performances. For example, a plastic beverage bottle with different colors can be placed on top of the LEDs to become a colorful lantern, or an ashtray can be used to provide a crystal light performance. The USB-charger can have any geometric shape such as a big round flat and thin shape that allows anything to be put top of it without occupying any extra desk space. The big round flat and thin unit can also have a nice surface finish such as a wooden, metalized, marble, stone, or antique brass finish to make the USB-charger become a very valuable item that people are more willing to put on a desk top. The USB-charger related product of FIG. 8A can have built-in USB-ports 29, outlets 28, and LED-units 50 or 51 only, without other electric function devices and a built-in AC power input wire which meet the outlet AC power wire standard.

As shown in FIG. 8C, the USB-charger product may include a motion sensor or remote control receiver means 52 installed on a front of the desktop USB-charger device to make electric signal contact easier. FIG. 8C shows a USB-charger related product having built-in USB-ports, outlets, LED-units and other electric function devices. The inner housing of the USB-charger products of FIGS. 8A to 8C may also have a built-in spring or retract means and other wire arranging parts and accessories to hold, store, coil, receive, release, pull, twist, extend, fold, or retract a wire by spring, elastic, roller, or rotating means to cause the AC power wire or receiving-end(s) wire to be well arranged for use in consideration of pre-designed requirements, performances, functions, and effects.

FIGS. 9A, 9B, 9C, 9D, 9E, 10A, 10B, 11A, and 11B also show built-in wire arrangements on a base to coil or release a wire from a USB-charger unit having a desired combination of USB-ports, outlets, LED-units and an optional added function device(s) so that the USB charger unit offers three or more functions including USB and outlet power supply, and the at least one added function.

FIGS. 10A 10B show USB-charger related products having built-in USB-port(s), outlet(s), LED-unit(s) and other electric function device(s) for a total of more than three functions for the USB-charger related product, the said built-in AC power wire which is meet the Outlet AC Power wire standard. Furthermore, the USB charger related products may incorporate other devices 55 such as a motion sensor device, time device, remote control device, Infrared device, LED light device, integrated circuit (IC), control device, sensor device, power fail device, color changing status-indicator devices, controller device, smell device(s), motion device, audio device, video device, cable TV device, Internet device, or other market-available electric or electronic devices. The preferred embodiment may have a master outlet feature 57, outlets having a built-in surge protection circuit, or a built-in retraction or spring means 56 to cause a wire to extend and be received back by elastic force, the wire being arranged on the bottom or within the housing at a desired location, space, room, compartment, gap, or wall.

FIGS. 11A and 11B show different combinations of the above-listed added function devices suitable for inclusion in the hand-reachable desk top USB-charger related products of the current invention.

Figure 12A:
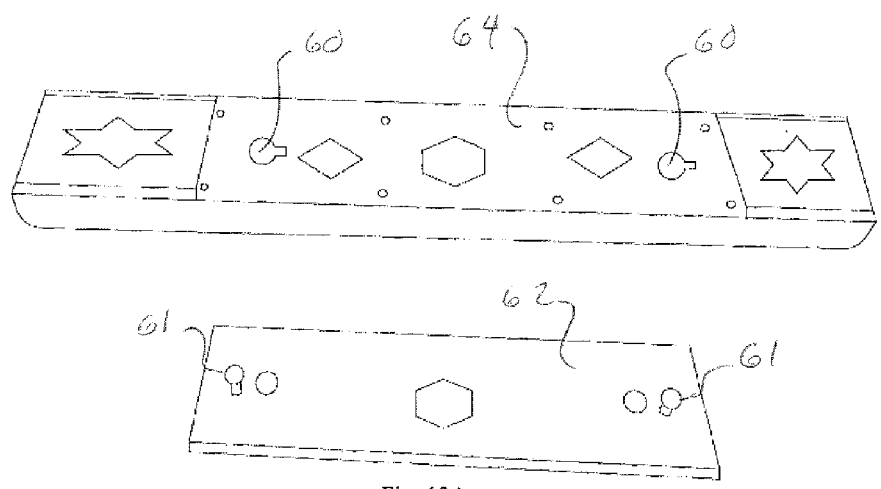

FIG. 12A shows a catch 60 and hook 61 of a holding arrangement that uses screws or double sided glue means for installing the a first plate 62 on a surface, with the catch 60 and hook 61 being used to fasten the USB-charger product 64 to the first plate 62, and thereby hold the USB-charger product 64 on the surface.

Figure 12B:
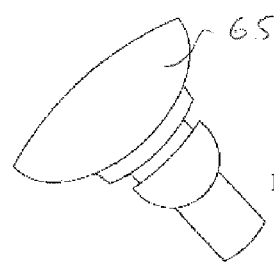

FIG. 12B shows a suction cup arrangement 65 installed within layers of the USB-charger product's housing to hold the product in position against force applied to the product.

The invention claimed is:

1. A hand-reachable desk top USB charger device with a wire arrangement, comprising:
    a USB charger including a USB-port for receiving and connecting with a plug-end of a USB wire connected to an external electric or digital device, the plug-end of the USB wire including a plug that is inserted into the USB-port to supply charging current for charging an internal energy storage device of the external electric or digital device;
    at least one additional device including at least one of another USB-port, an AC outlet device, a motion sensor device, a time device, a remote control device an infrared device, and LED light device, an integrated circuit, a control device, a sensor device, a power fail device, a color changing status-indicating device, a smell device, a motion device, an audio device, a video device, a cable TV device, an Internet device, a wireless device, an electrical device, and an electronic device, said additional device providing at least one additional function;
    a wire arrangement means for arranging the USB wire connected to the external electric or digital device while the plug is inserted into the USB-port for charging of the internal energy storage device of the external electric or digital device, or for arranging an AC input wire for supplying an AC input current from an external power source to the USB charger, by coiling or wrapping the USB wire or AC input wire around a pole within a space in the USB charger, the wire arrangement means including a cover or holder for retaining the USB wire or AC input wire in the wire arrangement means and a mechanism for winding and retracting the wire from the space,
    wherein the USB charger includes circuitry for converting the AC input current, which has a voltage of between 110V and 250V AC, into a DC output current of at least 1 Amp and between 3.5V and 8.5V DC,
    wherein the hand-reachable desk top USB charger device is arranged to be situated in a hand-reachable position on a desk top during use, the USB charger device including attachment means for holding the USB charger device on the desk top, the attachment means including at least one of the following: glue, screws, a heavy weight, a catch and hook fastener, Velcro™, double-sided foam tape, a hook and loop fastener, at least one suction cup, a magnetic fastener, and a movement-preventer so that the USB charger can be reached by a user to charge the electric or digital device without having to bend over to reach the USB charger.

2. A hand-reachable desk top USB charger device with a wire arrangement as claimed in claim 1, wherein the USB charger device has only USB-ports and no AC outlet, LED unit, or other electrical device, and the AC input wire has a gauge of less than or equal to 16.

3. A hand-reachable desk top USB charger device with a wire arrangement as claimed in claim 1, wherein the USB charger device has only USB-ports and at least one AC outlet, and wherein the USB charger device further includes outlet safety or convenience parts and accessories selected from a surge protection device, a remote control device, a master power controller, a sensor device, a current leakage warning device, and an auto shut off device.

4. A hand-reachable desk top USB charger device with a wire arrangement as claimed in claim 1, wherein the USB charger device has only USB-ports, at least one AC outlet, and at least one LED-unit, and wherein the AC input wire has a gauge sufficient to meet safety requirements for a device having AC outlets.

5. A hand-reachable desk top USB charger device with a wire arrangement as claimed in claim 1, wherein the AC input wire has a gauge sufficient to meet safety requirements for a device having AC outlets.

6. A hand-reachable desk top USB charger device with a wire arrangement as claimed in claim 1, wherein the wire arrangement includes elastic, roller, or rotating means to enable extension and retraction of the USB wire or AC input wire by rotating or twisting.

7. A hand-reachable desk top USB charger device with a wire arrangement as claimed in claim 1, wherein the USB charger device has a top on which other objects may be positioned during use so as to save desk top space.

8. A hand-reachable desk top USB charger device with a wire arrangement as claimed in claim 1, wherein the USB charger device is included in an extension cord to be hand-reachably attached to a desk surface.

* * * * *